United States Patent [19]
Martin et al.

[11] Patent Number: 4,752,390
[45] Date of Patent: Jun. 21, 1988

[54] ROTARY VACUUM FILTERS WITH A HORIZONTAL FILTRATION PLANE

[75] Inventors: Georges-Francois Martin, Flémalle; Armand L. Davister, Liège, both of Belgium

[73] Assignee: Prayon Developpement S.A., Belgium

[21] Appl. No.: 810,308

[22] PCT Filed: Feb. 28, 1985

[86] PCT No.: PCT/BE85/00004
§ 371 Date: Nov. 14, 1985
§ 102(e) Date: Nov. 14, 1985

[87] PCT Pub. No.: WO85/04113
PCT Pub. Date: Sep. 26, 1985

[30] Foreign Application Priority Data
Mar. 14, 1984 [LU] Luxembourg ............ 85251

[51] Int. Cl.$^4$ ............................................. B01D 35/08
[52] U.S. Cl. ..................................... 210/188; 210/328; 210/344; 55/185
[58] Field of Search ............. 210/188, 218, 257.1, 210/258, 260, 328, 330, 332, 334, 345, 346, 409, 304, 305, 521, 344, 347; 137/625.45, 625.46; 55/183, 185

[56] References Cited
U.S. PATENT DOCUMENTS

| 2,684,158 | 7/1954 | Delruelle | 210/203 |
| 2,997,068 | 8/1961 | Roos | 210/328 |
| 3,072,136 | 1/1963 | Roos | 137/625.46 |
| 3,361,262 | 1/1968 | Orr et al. | 210/330 |
| 3,830,658 | 8/1974 | Davister | 210/328 |
| 4,172,791 | 10/1979 | Davister | 210/328 |
| 4,330,404 | 5/1982 | Davister | 210/328 |
| 4,603,000 | 7/1986 | Casey | 210/188 |

FOREIGN PATENT DOCUMENTS
999442 1/1952 France.
2362962 5/1977 France.

Primary Examiner—Richard V. Fisher
Assistant Examiner—Wanda L. Millard
Attorney, Agent, or Firm—Fishman, Dionne & Cantor

[57] ABSTRACT

Vacuum rotary filter with horizontal filtering plane comprising a distributor consisting of a distributor part, a collector part and a gas separation chamber. The collector part (110) consists of a single vat divided into three compartments (139, 140, 141, respectively), for the mother water, the first washing liquid and the second washing liquid. The compartments may be interconnected so as to enable a fluid circulation in an imposed direction. The collector part also comprises a sector for annex operations and presuction.

20 Claims, 6 Drawing Sheets

ROTARY VACUUM FILTERS WITH A HORIZONTAL FILTRATION PLANE

The present invention relates to an improvement made to rotary vacuum filters with a horizontal filtration plane. The said improvement relates more particularly to the distributor of vertical axis, with which these filters are equipped and the functions of which are to collect, distribute and store the fluids coming from the movable filter elements of the filter towards the fixed device or devices discharging these fluids.

Filters with a horizontal filtration plane, with which the invention is concerned and which are known at the present time, can have either an annular surface called a "filter table", divided into filter elements placed next to one another and immobilized relative to one another, and therefore receiving a continuous filter cake, or a filter surface consisting of filter cells which are placed next to one another, but which can be tilted individually.

Although the present description of the invention is based on a practical example of a filter of the type with tiltable cells, it is not limited to this type of filter, but applies equally to other type of filter known per se.

As already described in the patent documents FR-A-No. 999,442, U.S. Pat. Nos. 2,684,158, 3,072,136, FR-A-No. 2,326,962, U.S. Pat. Nos. 4,172,791 and 4,330,404, a filter of this type is composed of a series of filter elements arranged annularly around a distributor, the said filter elements being driven in rotation about the said distributor in order to pass through a complete operating cycle, and of distributor collecting and distributing the fluids coming from the filter elements connected to it. The distributors of these known filters comprise essentially a distributing part and a collecting part which slide relative to one another, the collecting part being divided into isolated chambers and compartments delimited by partitions and in communication with one or more suction and discharge devices for the gases and liquids, the said chambers each communicating with a suction or pressure device. The distributing part has, matching each of the filter elements, cavities which, during the cyclic movement, open in succession opposite each of the compartments and chambers, in such a way that each element is put in communication successively with each of the said compartments and chambers.

However, these filters equipped with the known distributors have many disadvantages.

On the one hand, the bulk of the devices of known type is fairly large, because of the presence of compartments in the form of individual receptacles combined with draw-off and such like pipes.

On the other hand, the separation of the gases and liquids is often unsatisfactory, because this separation usually has to be carried out in small volumes with changes in direction of less than 180°. Moreover, pre-suction is very difficult, indeed impossible, to adjust accurately. By pre-suction is meant a first filtration, during which the first turbid filtrate is collected during the formation of the filter cake.

It has also been proposed in the patent document FR-A-No. 999,442 to arrange the gas separation chamber outside the actual distributor. However, this solution does not solve all the problems satisfactorily, and the bulk still remains large.

The object of the present invention is consequently to provide a continuous rotary vacuum filter with a horizontal filtration plane, the distributor of which has a more compact construction allowing a saving of space or, with a bulk similar to that of known filters, a mode of operation with markedly larger volumes of filtrate buffer compartments. Moreover, the aim is also to improve the separation of the gases and liquids and provide the possibility of easier adjustment of pre-suction and the addition of ancillary functions.

Consequently, the present invention relates to a rotary vacuum filter with a substantially horizontal filtration plane, which possesses a distributor consisting of a fixed collecting part composed of a single generally cylindrical tank, of a movable distributing part possessing cavities communicating with the various filter elements, the said collecting part being located underneath the said distributing part and being matched to the latter in such a way that the distributing part can rotate about its axis and slide on the collecting part, and of a separating chamber provided with at least one pipe discharging the gases separated from the filtrates and prolonging the central part of the collecting part, an annular space delimited by an outer wall and an inner wall and being arranged in the upper part of the said collecting part, so as to convey substantially vertically into the latter the filtrates arriving via the mouth of the cavities connected to the filter elements, whilst at the same time a sufficient distance from the upper level of the filtration liquid of the corresponding compartment is maintained to allow the separation of the gases during the vertical fall of the liquid in the collecting part.

According to a particularly preferred embodiment of the present invention, the collecting part is divided into at least two compartments by vertical radial separating walls which are preferably angularly adjustable and which extend from the bottom of the said collecting part into the gas separation chamber.

Advantageously, the gas separation chamber prolongs the central part of the cylindrical tank of the collecting part, and the gas/liquid separation takes place in the upper part of the collecting part and is completed in the truncated separation chamber located above the collecting part.

In this way, the various compartments, the various separation sectors and the filtrate storage tanks are combined into a distinctly more compact distributor. Furthermore, larger volumes are available, and the separation of the filtration gases and liquids is substantially improved in the separation chamber formed in this way.

According to a preferred embodiment, the collecting part incorporates at least three compartments separated by vertical radial walls. This arrangement makes it possible to provide at least one first compartment for the mother liquor, a second compartment for the liquid from the first wash and a third compartment for the liquid from the second wash.

Advantageously, the separation chamber can also incorporate fittings forming a "baffle", to improve further the separation of the liquids from the gas phase.

According to a particularly preferred embodiment, the wall separating the compartment containing the mother liquors from that containing the first-wash liquid and the wall separating the compartment containing the first-wash liquid and that containing the second-wash liquid each have an orifice for passage from one compartment to the other, located at a level allowing the filtrate to pass from one compartment to the other in a prescribed direction. Thus, the second more dilute wash can overflow into the first wash, and the latter into the mother liquors.

Further advantages and details of the present invention will emerge more clearly from the description of a preferred embodiment of the present invention, with reference to the attached figures in which.

In the various figures, the same reference numerals denote similar or identical elements.

Although the present specification is based more particularly on the example of continuous rotary filters with preferably tiltable cells, the invention must not be considered as being limited to these continuous rotary filters, but applies in general to the distributors of rotary vacuum filters with a substantially horizontal filtration plane of other types.

The filters generally comprise a series of filtration units, commonly called "cells", which undergo separately in a discontinuous way the successive filtration operations, washes, various special treatments, discharge of the cake formed on the filter surface, and washing and drying of the cells and filter cloth. All these various operations are repeated during each of the cycles of movement, the cycles as a whole constituting a continuous overall process integrated in a filtration chain.

Figure 1:
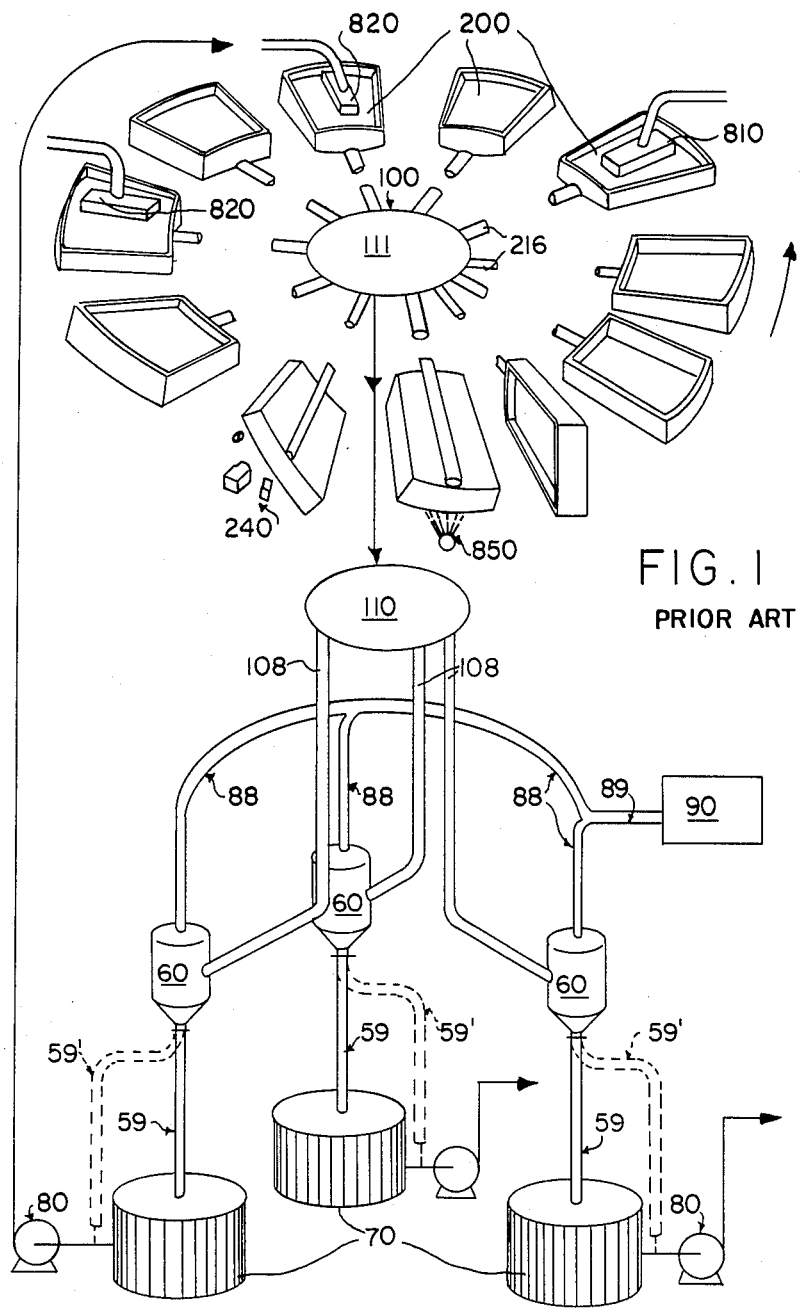
FIGS. 1, 2 and 3 are diagrammatic views, in perspective, in plan and in elevation, of a rotary filter with tilting cells belonging to the state of the art.
Figure 2:
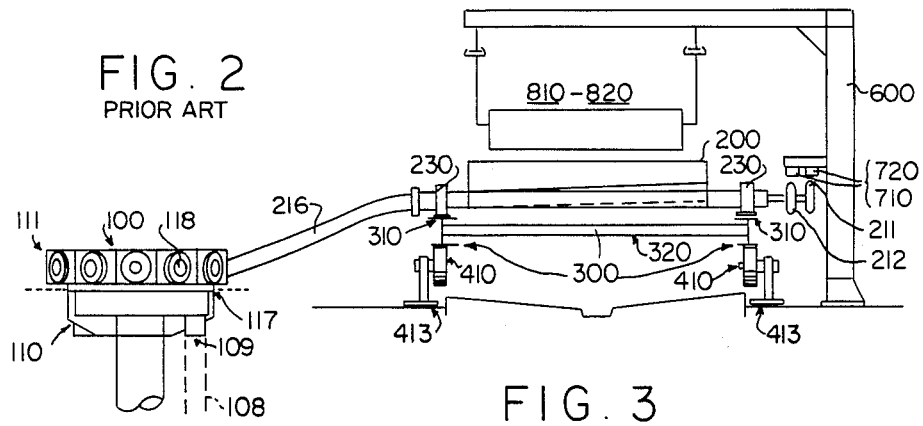
Figure 3:
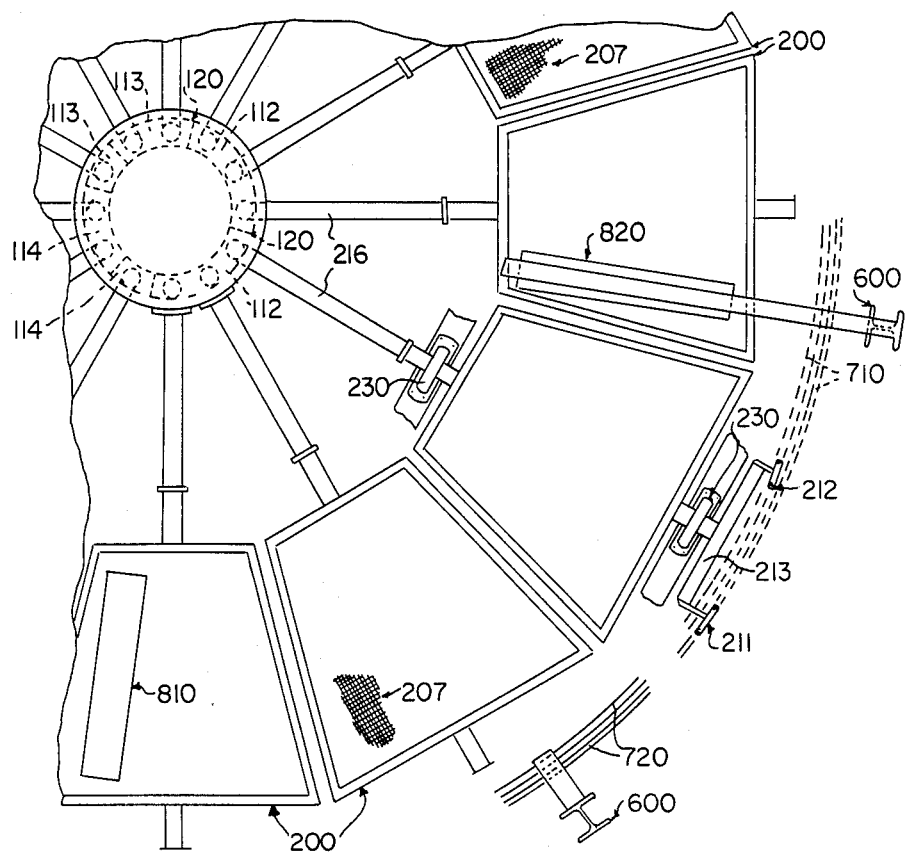
Figure 4:
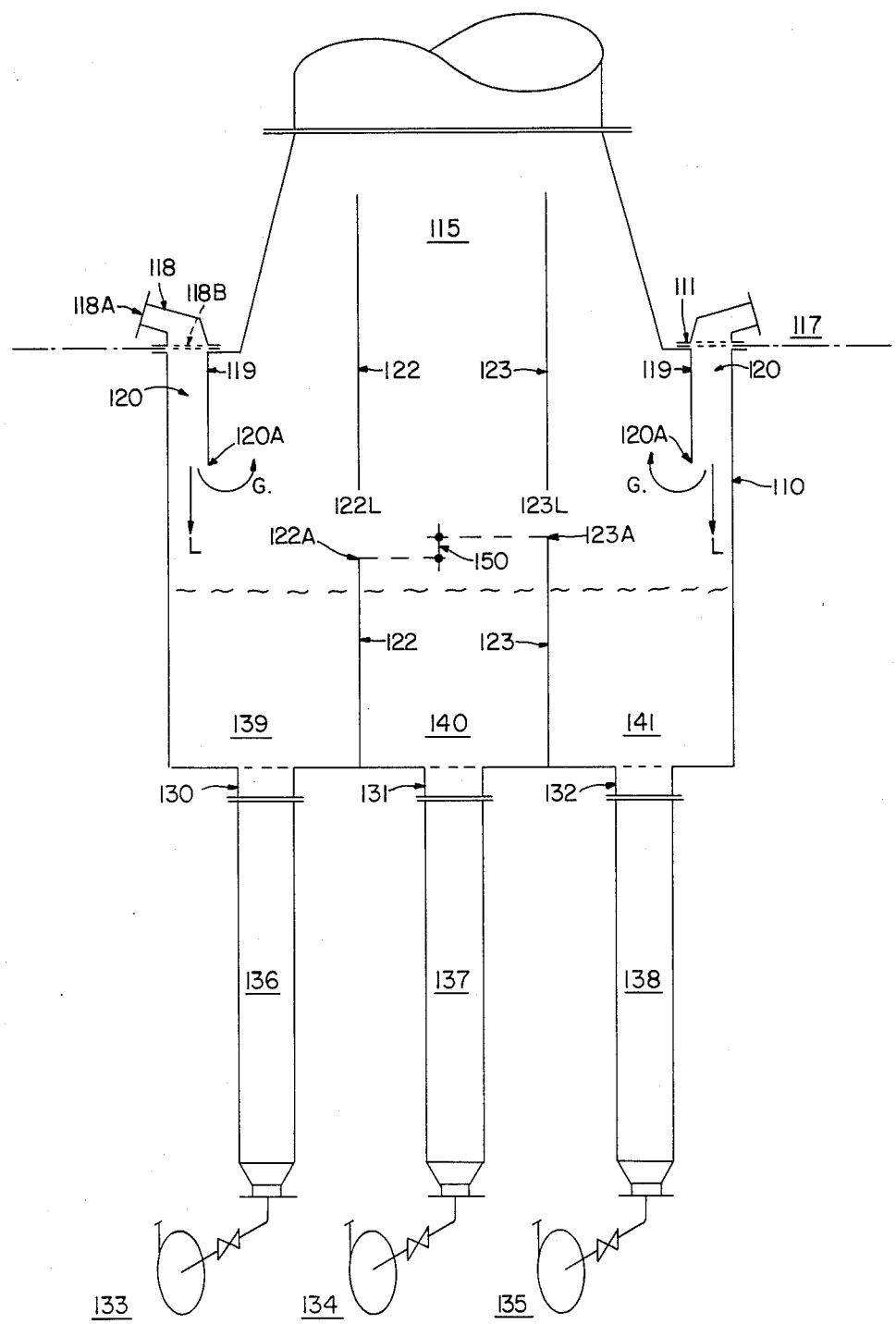
FIG. 4 is a diagrammatic view of a distributor according to the present invention.

An example of such a filtration chain is indicated diagrammatically in FIG. 1, whilst other details of a corresponding filter have been indicated in FIGS. 2 and 3.

Such a filter comprises essentially:

(a) a rotary frame 300 composed of circular members 310 fixed to one another by radial connecting arms 320 carrying cells 200 by means of bearings 230, these members rotating on two series of rollers 410 secured to the foundations and arranged in two concentric circles, the movement remaining centered as a result of the action of centering rollers (not shown);

(b) a drive unit (not shown) which transmits the movement to the rotary frame by means of a toothed rack fastened to one of the circular members 310;

(c) cell guide levers 213 carrying two rollers 211, 212 which roll on rails 710-720 attached to a peripheral structure 600;

(d) distribution troughs 810 and 820 which are suspended from the structure 600 above the cells and which distribute into the latter the slurry to be filtered and the washing liquors;

(e) a central distributor 100 consisting essentially, on the one hand, of a rotary circular distributing head 111 which possesses cavities 118 arranged in a circle and connected respectively to the cells 200 by means of flexible tubes 216 and which rotates in synchronism with the frame 300 and the cells 200, and, on the other hand, of a fixed circular collecting base 100 which incorporates chambers and compartments delimited by partitions, the rotary head 111 sliding in rotation on the fixed base 110 by means of a plane friction gasket 117.

The distribution troughs 810-820 arranged to correspond to the partitions delimit successive filtration and washing sectors, and the liquids and gases which have passed through the filter beds of the cells of each of these sectors are collected in compartments and then eliminated via corresponding pipes 108 towards separators 60, from where the liquids are discharged via tail pipes 59 into collecting tanks 70 or, as shown by dot-and-dash lines in FIG. 1, via pipes 59 towards suction pumps 80, the gases being sucked upwards from these separators towards a vacuum circuit 90 via a colletor 88–89.

The improvements achieved by means of the present invention combine the various pieces of equipment designated by 110, 108, 88, 60, 59 and 70, so as to form a single highly compact assembly for distributing, separating and storing the various fluids.

As in conventional distributors, the apparatus according to the present invention comprises a movable distributing head 111 with as many cavities 118 as there are filter elements, these cavities receiving via their ends 118A, each connected to an element by means of a flexible pipe 216 (FIGS. 1 to 3), the fluids drawn off from them and discharging these fluids in succession via their ends 118B into the various lower compartments via the friction gasket 117.

The gases and liquids drawn off from the filter and guided by the cylindrical wall 119 descend vertically in the annular chamber 120. In the lower part of the chamber 120 at the point 120A, the liquids (L) continue their vertical downward path, whilst the gases (G) experience a change in direction of 180 degrees and are sucked upwards into the separating chamber 115.

The separating chamber 115 can advantageously incorporate fittings or walls performing the function of "baffles", in order to improve further the separation of the liquids from the gas phase.

The upper plane 117 of the annular distribution and separation space 120 coincides with the friction gasket 117.

The radial walls 122 and 123 between the filtration of the mother liquors and the first wash and between the first wash and the second wash respectively (the number of walls may be different from two depending on the number of washes) are prolonged into the separation chamber 115.

Advantageously, the radial walls 122 and 123 are angularly adjustable, the wall 124 being fixed, so that the cut-off between the filtrates of different densities is clean and correct. Locking and control can be carried out by any means known per se, once the leak-tightness between the compartments is ensured.

According to an alternative form, the walls 122 and 123 each have an orifice 122L and 123L made above the lower part of the walls normally containing the filtrates, to make it possible for the filtrates to pass from one compartment to the other, but in a prescribed direction, and in this way the second more dilute wash could overflow into the first wash and the latter into the mother liquors, this being achieved because the edge 123A is at a level higher than the edge 122A by a distance 150.

The wall 124 separating the last filtrate (here the sacond wash) from the mother liquors extends at least over the entire height of the tank and prevents any communication between the most dilute filtrate and the mother liquors.

The cylindrical sectors 139, 140, 141 receiving and containing the filtrates are provided in their lower part with necks 130, 131, 132 supplying the filtrate pumps 133, 134, 135 via the pipes 136, 137, 138.

The partitions at the end 125 and start 127 of vacuum filtration are also shown (FIG. 6), and between these is located an annular sector 129, by means of which the ancillary operations of, for example, the blowing of the cake, drying of the cloth and drainage of residual water can be carried out.

This annular sector 129 is isolated from the tank by a horizontal wall 128, in such a way that the fluids passing through it have to be drawn off or introduced laterally (125B, 126B, 127B) so that, with the exception of this annular space, the entire volume of the tank is available for the vacuum filtrates. The said annular sector is astride the vertical wall 124 separating the mother liquors from the last washing filtrate. Of course, the said sector 129 has as many chambers as there are ancillary operations to be carried out.

Figure 6:
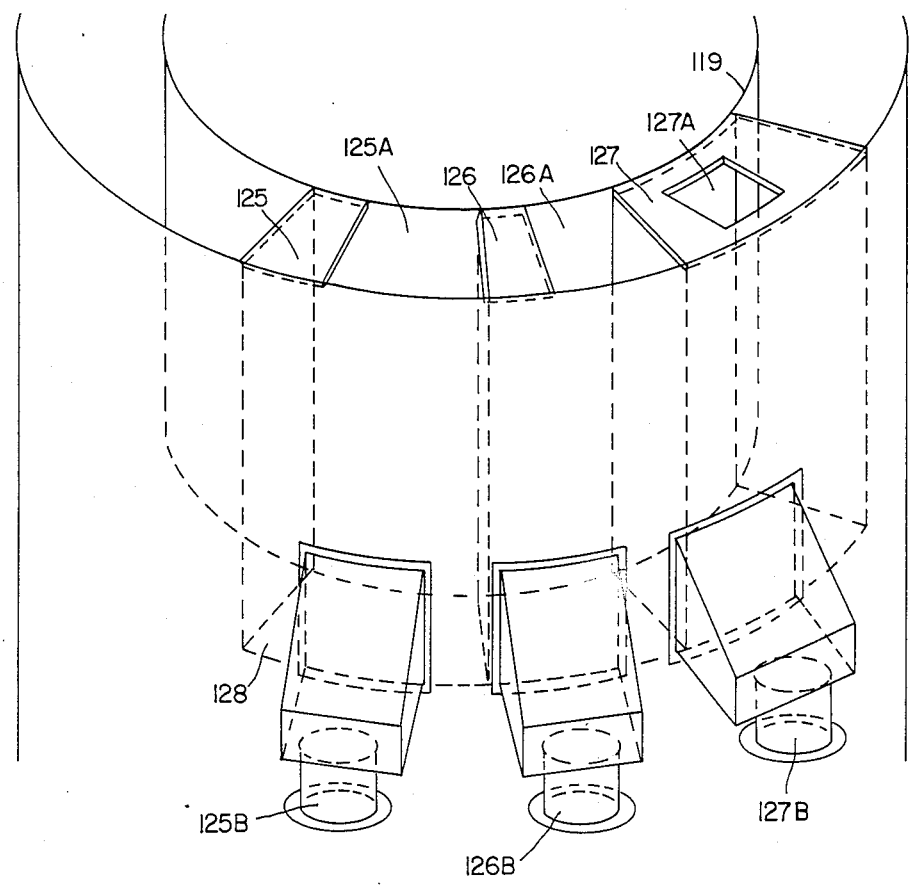
FIG. 6 is a partial diagrammatic view in perspective of the collecting part of the distributor, showing a detail making it possible to carry out ancillary operations.

FIG. 6 shows the sector assigned to the ancillary operations and isolated from the vacuum filtration sectors by the partitions 125 and 127.

The ancillary operations can be in succession:
the blowing of air through the orifice 125A to make it easier to discharge the filter cake and wash the filter fabrics;
the suction of air through the orifice 126A to dry the filter fabrics.

Furthermore, in the partition 127 corresponding to the operation of feeding slurry into the cells there is an orifice 127A which allows additional drainage of the residual water flowing off from the cells.

Figure 5:
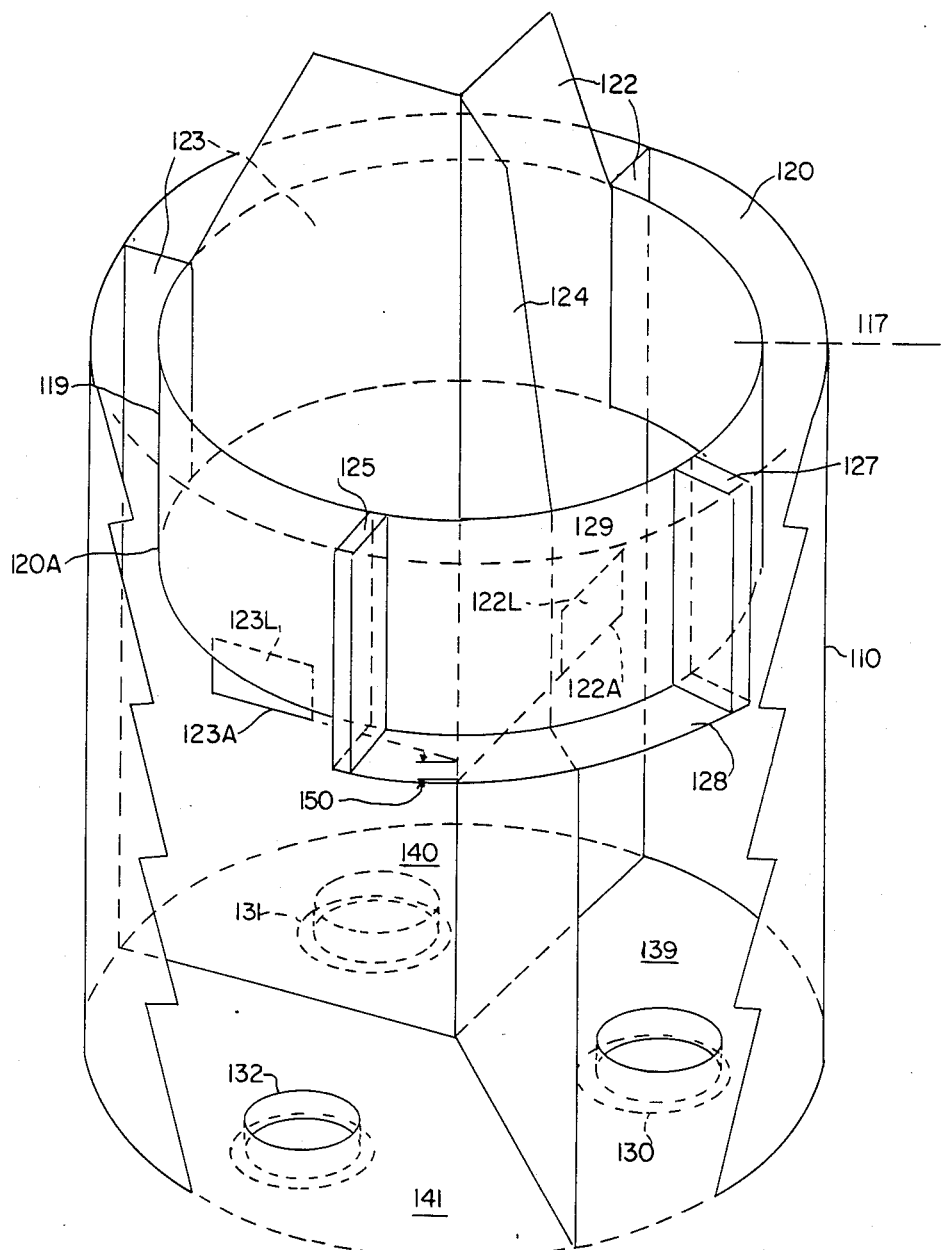
FIG. 5 is a diagrammatic perspective view of the collecting and separating parts of a distributor according to the present invention, the friction surfaces and the truncated cover not being shown for the sake of clarity.
Figure 7:
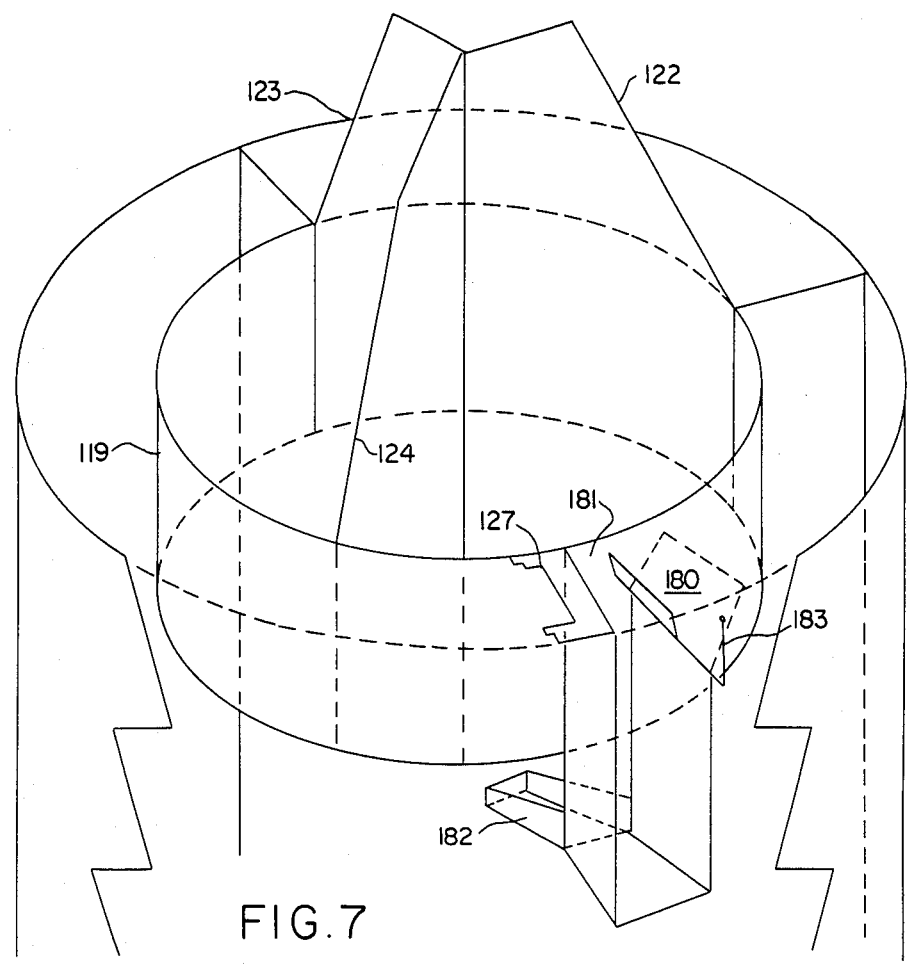
FIG. 7 is a diagrammatic perspective view showing how the pre-suction has been redesigned accordingly.
Figure 8:
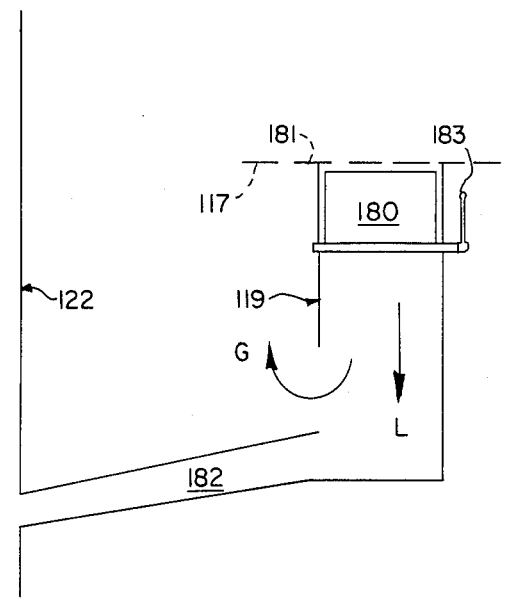
FIG. 8 is a side view of the pre-suction flap.

Another device can also be provided in the cylindrical part of the distributor, this being a first filtration section, called pre-suction, where the first turbid filtrate is collected during the formation of the filter cake. This first pre-suction section is installed in the mother-liquor compartment according to FIGS. 7 and 8. The first liquid collected passes through the adjustable orifice 181 and, after being separated from the gas accompanying it, returns via the duct 182 to the first-wash compartment located between the walls 122 and 123 (FIG. 5).

The orifice 181 can be adjusted when the flap 180 is tilted, for example by means of a lever 183 actuated from outside the collecting part.

It will be seen from a reading of the present specification that the rotary vacuum filter with a horizontal filtration plane, equipped with a distributor according to the invention, has an important advantage in comparison with existing devices, this being that the separation of the filtration gases and liquids is improved substantially because of a change in direction of the order of 180 degrees and because of a larger available volume which is such that the level of liquid in the compartments is fairly low. The passage cross-sections for the gases and liquids are greatly enlarged and the circulation speeds are greatly reduced, thus improving the separation between the gases and liquids.

Moreover, the volume of the compartments is sufficient to make it possible to connect extraction pumps directly to them, without having to pass via auxiliary tanks. Consequently, it is possible to work without pressure drops from a height relative to the vacuum generated and install the filter at a lower level, inasmuch as suction pumps are used.

It should also be noted that the compact assembly of the collecting part makes it possible to avoid cooling and the crystallization and incrustation resulting from it, thus making maintenance easier and less frequent and consequently less expensive.

Where filtrates releasing disturbing or noxious vapours are concerned, the elimination of filtrate storage tanks 70 ensures that there is no longer any need for a ventilation device for this part of the installation.

Although the present specification describes a particularly preferred embodiment of the invention, the latter is certainly not limited to this embodiment and also embraces all the equivalent means making it possible to achieve the same object, as well as all the embodiments covered by the claims.

We claim:

1. A rotary vacuum filter with a substantially horizontal filtration plane including a plurality of filter elements and a distributor means for collecting and distributing filtrates comprised of gas and liquid portions received from the filter elements, the distributor means comprising a distributing member and a collecting member which slide relative to one another in a cyclic movement, the collecting member having at least one compartment and communicating with at least one suction and discharge means for suctioning and discharging the filtrates from the filter element, the distributing member having a cavity corresponding to each of the filter elements, the cavities successively opening to a selected compartment during the cyclic movement so that each filter element is successively in communication with each compartment and with each corresponding cavity, the rotary vacuum filter further including:
said collecting member of said distributor means comprising a fixed tank and said distributing member of said distributor means being moveable relative to said fixed collecting member, said collecting member being located below said distributing member;
a separating chamber extending from a central portion of said collecting member and having at least one pipe for discharging gas portions separated from said filtrates;
an annular space defined by an outer wall and an inner wall and being located in an upper portion of said collecting member wherein said filtrates received from said filter elements are downwardly conveyed into said collecting member upper portion and wherein the gas portion is separated from the liquid portion of said filtrates during said downward conveyance of said filtrates; and
wherein said collecting member of said distributor means incorporates a sector for ancillary operations, said sector being isolated from said collecting member by a horizontal wall, said sector having as many chambers as there are ancillary operations.

2. Filter according to claim 1 wherein said collecting member is divided into at least two of said compartments by vertical radial walls extending from a bottom portion of said collecting member into said separating chamber.

3. Filter according to claim 2 wherein said collecting member incorporates at least three of said compartments separated by said vertical radial walls.

4. Filter according to claim 3 wherein said vertical radial walls each have an orifice for passage of liquid from one compartment to the other, said orifices being located at a level which allows said filtrate to pass from one compartment to the other in a predetermined direction.

5. Filter according to claim 3 wherein each of said compartments possesses bottom orifices for discharge of filtrate.

6. Filter according to claim 2 wherein said walls separating said compartments are angularly adjustable.

7. Filter according to claim 2 wherein said vertical radial walls each have an orifice for passage of liquid from one compartment to the other, said orifices being located at a level which allows said filtrate to pass from one compartment to the other in a predetermined direction.

8. Filter according to claim 2 wherein each of said compartments possesses bottom orifices for discharge of filtrate.

9. Filter according to claim 1 wherein said separating chamber includes walls defining a "baffle".

10. Filter according to claim 1 wherein said collecting member incorporates a first-filtration section having an orifice which is adjusted by means of a tiltable flap wherein liquid collected is returned to a first-wash compartment.

11. Filter of claim 1 wherein:
said collecting member is a substantially cylindrical tank.

12. A rotary vacuum filter with a substantially horizontal filtration plane including a plurality of filter elements and a distributor means for collecting and distributing filtrates comprised of gas and liquid portions received from the filter elements, the distributor means comprising a distributing member and a collecting member which slide relative to one another in a cyclic movement, the collecting member having at least one compartment and communicating with at least one suction and discharge means for suctioning and discharging the filtrates from the filter element, the distributing member having a cavity corresponding to each of the filter elements, the cavities successively opening to a selected compartment during the cyclic movement so that each filter element is successively in communication with each compartment and with each corresponding cavity, the rotary vacuum filter further including:
said collecting member of said distributor means comprising a fixed tank and said distributing member of said distributor means being movable relative to said fixed collecting member, said collecting member being located below said distributing member;
a separating chamber extending from a central portion of said collecting member and having at least one pipe for discharging gas portions separated from said filtrates;
an annular space defined by an outer wall and an inner wall and being located in an upper portion of said collecting member wherein said filtrates received from said filter elements are downwardly conveyed into said collecting member upper portion and wherein the gas portion is separated from the liquid portion of said filtrates during said downward conveyance of said filtrates; and
wherein said collecting member is divided into at least two of said compartments by vertical radial walls extending from a bottom portion of said collecting member into said separating chamber wherein said vertical radial walls each have an orifice for passage of liquid from one compartment to the other, said orifices being located at a level which allows said filtrate to pass from one compartment to the other in a predetermined direction.

13. Filter according to claim 12 wherein said collecting member incorporates at least three of said compartments separated by said vertical radial walls.

14. Filter according to claim 12 wherein said walls separating said compartments are angularly adjustable.

15. Filter according to claim 12 wherein said separating chamber includes walls defining a "baffle".

16. Filter according to claim 12 wherein each of said compartments possesses bottom orifices for discharge of filtrate.

17. A rotary vacuum filter with a substantially horizontal filtration plane including a plurality of filter elements and a distributor means for collecting and distributing filtrates compriseed of gas and liquid portions received form the filter elements, the distributor means comprising a distributing member and a collecting member which slide relative to one another in a cyclic movement, the collecting member having at least one compartment and communicating with at least one suction and discharge means for suctioning and discharging the filtrates from the filter element, the distributing member having a cavity corresponding to each of the filter elements, the cavities successively opening to a selected compartment during the cyclic movement so that each filter element is successively in communication with each compartment and with each corresponding cavity, the rotary vacuum filter further including:
said collecting member of said distributor means comprising a fixed tank and said distributing member of said distributor means being movable relative to said fixed collecting member, said collecting member being located below said distributing member;
a separating chamber extending from a central portion of said collecting member and having at least one pipe for discharging gas portions separated from said filtrates;
an annular space defined by an outer wall and an inner wall and being located in an upper portion of said collecting member wherein said filtrates received from said filter elements are downwardly conveyed into said collecting member upper portion and wherein the gas portion is separated from the liquid portion of said filtrates during said downward conveyance of said filtrates; and
wherein said collecting member incorporates a first filtration section having an orifice which is adjusted by means of a tiltable flap wherein liquid collected is returned to a first wash compartment.

18. A rotary vacuum filter with a substantially horizontal filtration plane including a plurality of filter elements and a distributor means for collecting and distributing filtrates comprised of gas and liquid portions received from the filter elements, the distributor means comprising a distributing member and a collecting member which slide relative to one another in a cyclic movement, the collecting member having at least one compartment and communicating with at least one suction and discharge means for suctioning and discharging the filtrates from the filter element, the distributing member having a cavity corresponding to each of the filter elements, the cavities successively opening to a selected compartment during the cyclic movement so that each filter element is successively in communication with each compartment and with each corresponding cavity, the rotary vacuum filter further including:

said collecting member of said distributor means comprising a fixed tank and said distributing member of said distributor means being movable relative to said fixed collecting member, said collecting member being located below said distributing member;

a separating chamber extending from a central portion of said collecting member and having at least one pipe for discharging gas portions separated form said filtrates;

an annular space defined by an outer wall and an inner wall and being located in an upper portion of said collecting member wherein said filtrates received from said filter elements are downwardly conveyed into said collecting member upper portion and wherein the gas portion is separated from the liquid portion of said filtrates during said downward conveyance of said filtrates; and wherein said collecting member is divided into at least three of said compartments by vertical radial walls extending form a bottom portion of said collecting member into said separating chamber, and wherein said vertical radial walls each have an orifice for passage of liquid from one compartment to the other, said orifices being located at a level which allows said filtrate to pass from one compartment to the other in a predetermined direction.

19. Filter according to claim 18 wherein said walls separating said compartments are angularly adjustable.

20. Filter according to claim 18 wherein said separating chamber includes walls defining a "baffle".

* * * * *